United States Patent
Rissmeyer et al.

(10) Patent No.: US 7,363,356 B1
(45) Date of Patent: Apr. 22, 2008

(54) BOOT MODIFICATION OF REGISTRY DATA FOR ISCSI NETWORK BOOT OPERATIONS

(75) Inventors: Charles Steven Rissmeyer, Coon Rapids, MN (US); Edward Alan Soltis, Elk River, MN (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 10/395,927

(22) Filed: Mar. 24, 2003

(51) Int. Cl.
*G06F 15/177* (2006.01)
(52) U.S. Cl. ....................... 709/220; 709/217
(58) Field of Classification Search ........... 709/217, 709/220; 713/1, 2, 100
See application file for complete search history.

(56) References Cited

U.S. PATENT DOCUMENTS

| | | | |
|---|---|---|---|
| 5,974,547 A * | 10/1999 | Klimenko | ............ 713/2 |
| 5,996,024 A | 11/1999 | Blumenau | |
| 6,105,130 A | 8/2000 | Wu et al. | |
| 6,434,695 B1 * | 8/2002 | Esfahani et al. | ........... 713/2 |
| 6,609,151 B1 * | 8/2003 | Khanna et al. | ......... 709/222 |
| 6,857,069 B1 * | 2/2005 | Rissmeyer et al. | ........ 713/2 |
| 7,127,602 B1 * | 10/2006 | Bakke et al. | ............ 713/2 |
| 2003/0097553 A1 | 5/2003 | Frye, Jr. | |
| 2003/0126242 A1 * | 7/2003 | Chang | ............... 709/222 |
| 2004/0064647 A1 * | 4/2004 | DeWhitt et al. | ......... 711/135 |
| 2004/0138868 A1 | 7/2004 | Kuznetsov et al. | |
| 2004/0153694 A1 | 8/2004 | Nicholson et al. | |

* cited by examiner

*Primary Examiner*—John Follansbee
*Assistant Examiner*—Dhairya A. Patel
(74) *Attorney, Agent, or Firm*—Schwegman, Lundberg & Woessner, P.A.

(57) ABSTRACT

In one embodiment, a method includes retrieving a network parameter for a computing device from a remote server. The method also includes updating data in a registry of the computing device based on the value of the network parameter. The retrieving of the network parameter and the updating of the data in the registry are performed prior to executing an operating system within the computing device.

19 Claims, 2 Drawing Sheets

BOOT MODIFICATION OF REGISTRY DATA FOR ISCSI NETWORK BOOT OPERATIONS

RELATED APPLICATION

This application is related to U.S. patent application entitled "iSCSI Computer Boot System and Method", Ser. No. 10/371,909, filed Feb. 21, 2003, now U.S. Pat. No. 7,127,602, issued Oct. 24, 2006, to Mark A Bakke, Edward A. Soltis, Pawlo P. Prawdiuk and Charles Steven Rissmeyer.

FIELD OF THE INVENTION

The invention generally relates to booting computers, and more specifically to a system and method for booting a computing using Internet Protocol Small Computer System Interface (iSCSI).

BACKGROUND OF THE INVENTION

Computers traditionally use built-in code known as a BIOS (Basic Input/Output System) to perform initial boot functions and to control certain attached devices before loading an operating system or other software. This enables a computer to receive input from a keyboard and to output data to a display and further provides the computer with control of devices such as serial communications ports and disk drives.

When booting, a computer typically either executes the BIOS from read only memory (ROM) or flash memory, or loads the BIOS into random access memory (RAM) and executes the BIOS code from RAM to perform initial testing, configuration, and to initialize loading an operating system. Certain computers are diskless and thus require these boot operations to be performed over a network connection. Accordingly, although operating systems are traditionally loaded from hard disks or diskette drives, BIOS extensions, such as the Preboot eXecution Environment (PXE) provide a computer system the ability to establish a network connection before loading an operating system, and to boot over the network connection via a network bootstrap program. Various other BIOS extensions provide the ability to boot via Universal Serial Bus (USB) or other interfaces.

The iSCSI protocol allows for the transmission of data across a network using SCSI commands over IP-based networks. Accordingly, the iSCSI protocol can be employed for such boot operations to enable the loading of the operating system from a remote server/storage device. However, in order to enable such remote boot operations, network parameters for the computer, such as the Internet Protocol (IP) address, subnet mask, gateway, etc., are to be configured prior to network connectivity with the server/storage device from which the operating system is to be loaded.

Typically, these network parameters are configured based on communications with a Dynamic Host Configuration Protocol (DHCP) server that dynamically assigns these parameters. However, the DHCP communications are typically not available until after the boot operations have been completed. Therefore, a typical approach for setting these network parameters prior to DHCP communications would be a manual setting of the parameters corresponding to the setting by the DHCP server. However, if these parameter values are set to invalid values or the computer is set to wait for the receipt of these parameters from the DHCP servers, the iSCSI network boot operations will be unable to perform network communications for remote boot operations.

SUMMARY OF THE INVENTION

In one embodiment, a method includes retrieving a network parameter for a computing device from a remote server. The method also includes updating data in a registry of the computing device based on the value of the network parameter. The retrieving of the network parameter and the updating of the data in the registry are performed prior to executing an operating system within the computing device.

In an embodiment, a method includes updating data for a port in a registry of a diskless Internet Protocol Small Computer System Interface (iSCSI) client based on retrieval of at least one network parameter from a Dynamic Host Configuration Protocol (DHCP) server. The port is a port providing iSCSI communications for the iSCSI client. The method also includes retrieving an iSCSI driver and an operating system for the diskless iSCSI client from a boot server. Additionally, the method includes booting the diskless iSCSI client with the retrieved operating system. The updating, the retrieving and the booting are performed prior to an operating system executing within the iSCSI client.

In one embodiment, an apparatus includes a registry operable to store system parameters for the apparatus. The apparatus also includes a memory that includes a protected area, wherein the protected area is operable to store at least one network parameter retrieved from a Dynamic Host Configuration Protocol (DHCP) server. The apparatus also includes a pre-Internet Protocol Small Computer System Interface logic operable to update data within the system parameters in the registry based on the at least one network parameter prior to execution of an operating system within the apparatus.

In an embodiment, a system includes a registry operable to store parameters for the system. The system also includes a random access memory that includes a protected shared memory. Additionally, the system includes a port operable to communicate Internet Protocol Small Computer System Interface (iSCSI) communications. The system also includes a processor operable to execute network boot logic and pre-iSCSI logic. The network boot logic is to retrieve at least one network parameter from a Dynamic Host Configuration Protocol (DHCP) server and is to store at least one network parameter in the protected shared memory. The pre-iSCSI logic is to update a value of at least one parameter related to network communications for the port among the parameters for the system in the registry prior to when the operating system is to execute network boot operations.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

A method, apparatus and system for different embodiments for boot time modification of the registry data for iSCSI network boot operations are described. Although embodiments of the invention are described in reference to a diskless client computer, embodiments of the invention can also be incorporated into computers having local disk drives, wherein boot operations are performed over a network which includes boot time modification of the registry data as described herein.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality with undue experimentation.

References in the specification to "one embodiment", "an embodiment", "an example embodiment", etc., indicate that the embodiment described may includes a particular feature, structure, or characteristic, but every embodiment may not necessarily include the particular feature, structure, or characteristic. Moreover, such phrases are not necessarily referring to the dame embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.).

In an exemplary embodiment, a machine-readable medium such as computer storage medium which includes volatile and/or non-volatile media (e.g. read only memory (ROM); random access memory (RAM); magnetic disk storage media; optical storage media; flash memory devices; etc) as well as transmission medium which includes optical, acoustical or other form of propagated signals (e.g. carrier waves, infrared signals, digital signals, etc).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for boot time modification of registry data for iSCSI network boot operations, in accordance with embodiments of the invention. A number of figures show flow diagram illustrating operations for boot time modification of registry data for iSCSI network boot operations. The operations of the flow diagrams will be described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagrams.

Figure 1:
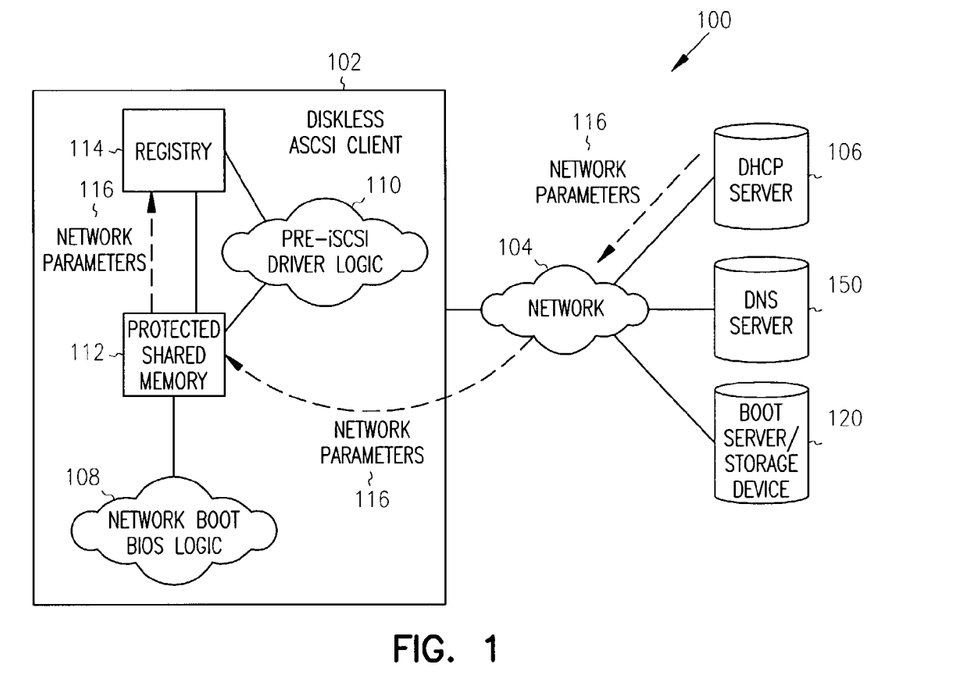
FIG. 1 illustrates a block diagram of a system that enables boot time modification of a registry for iSCSI network boot operations, according to one embodiment of the invention.

FIG. 1 illustrates a block diagram of a system that allows for boot time modification of a registry for iSCSI network boot operations, according to one embodiment of the invention. FIG. 1 illustrates a system 100 that includes a diskless iSCSI client 102, a DHCP server 106, a boot server/storage device 120 and a Domain Name (DNS) Server 150, which are coupled together through a network 104. The diskless iSCSI client 102 includes a network boot BIOS logic 108, a pre-iSCSI driver logic 110, a registry 114 and a protected shared memory 112.

In one embodiment, the registry 114 is database for storage of a number of different system values for the diskless iSCSI client 102. Examples of the type of system values include the Internet Protocol (IP) addresses of the network interfaces (logical and/or physical) of the diskless iSCSI client 102, subnet masks for such IP addresses, the gateway for the diskless iSCSI client 102 out to the network 104, names/addresses of servers to which the diskless iSCSI client 102 communicates (e.g., the DNS server 150), Security Identifiers (SIDs) within the diskless iSCSI client 102, etc.

As will be described in more detail below, the network boot BIOS logic 108 retrieves a number of network parameters 116 from the DHCP server 106 and stores the network parameters 116 into the protected shared memory 112. In one embodiment, the network parameters 116 include the IP address of the given port (physical and/or logical) of the diskless iSCSI client 102 that provide for iSCSI operations. For example, the diskless iSCSI client 102 utilizes iSCSI communications to communicate with the boot server/storage device 120 for retrieval of boot drivers, the operating system, etc. A more detailed description of this retrieval and operations of the boot drivers (including an ISCSI boot driver) and an operating system for the diskless iSCSI client 102 is described in more detail in U.S. patent application entitled "iSCSI Computer Boot System and Method", Ser. No. 10/371,909, filed Feb. 21, 2003, to Mark A. Bakke, Edward A. Soltis, Pawlo P. Prawdiuk and Charles Stevens Rissmeyer. In addition to this IP address for the port(s) that provide iSCSI communications, in one embodiment, the network parameters 116 include the subnet mask and gateway for the diskless iSCSI client 102. In one embodiment, the network parameters 116 include the IP address of the DNS server 150 to allow for the translation between the names and IP addresses of devices coupled to the network 104. As described in more detail below, the pre-iSCSI driver logic 110 retrieves the network parameters 116 from the protected shared memory 112 and updates the appropriate system values within the registry 114.

As will be described, the retrieval of the network parameters 116 and the updating of the associated system values within the registry 114 occur prior to the execution of the operation system within the diskless iSCSI client 102. Therefore, a static IP address is not required to be assigned to the diskless iSCSI client 102 for network communications. Moreover, there is no need to retrieve network parameters from the DHCP server 106 subsequent to when the operating system begins executing on the diskless iSCSI client 102. In turn, a user/administrator is not required to manually enter network parameters that will match the network parameters retrieved from the DHCP server 106 subsequent to network boot operations, thereby eliminating the probability of a mismatch between the manually entered network parameters and the network parameters retrieved from the DHCP server 106. Accordingly, the correct network parameters 116 (e.g., the IP address for the diskless iSCSI client 102) are stored in the registry 114 prior to network boot operations and iSCSI communications. Although the various devices shown in FIG. 1 are identified using various names, the various computerized systems and servers may take any form, including routers, networked appliances, set top boxes, telecommunications equipments (e.g., switches) or any other form consistent with embodiments of the invention as claimed in the appended claims.

Figure 2:
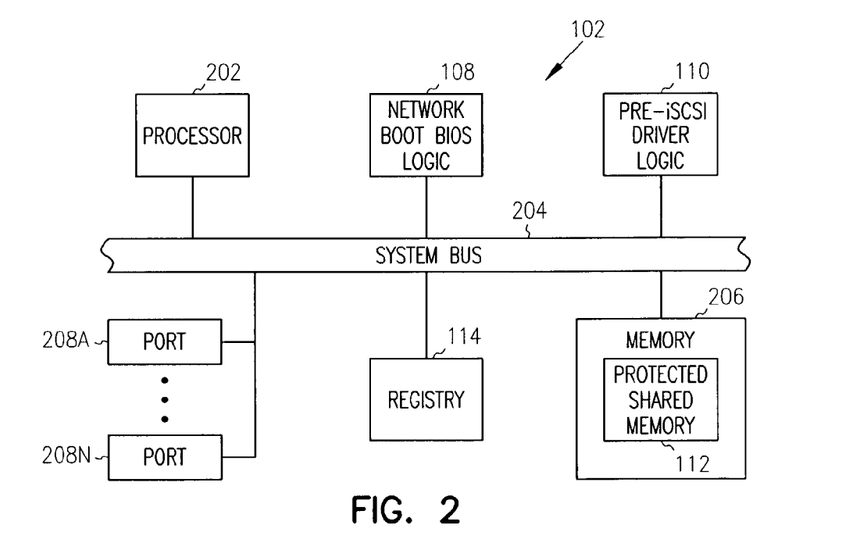
FIG. 2 illustrates a more detailed block diagram of a diskless iSCSI client, according to one embodiment of the invention.

A more detailed block diagram of one embodiment of the diskless iSCSI client 102 will now be described. FIG. 2 illustrates a more detailed block diagram of a diskless iSCSI client, according to one embodiment of the invention. In particular, FIG. 2 illustrates one embodiment of the diskless iSCSI client 102 that includes a processor 202, the network boot BIOS logic 108, the pre-iSCSI driver logic 110, ports 208A-208N, the registry 114 and a memory 206, which are coupled together through a system bus 204.

In one embodiment, the memory 206 is a random access memory. As shown, in one embodiment, the protected shared memory 112 is a part of the memory 206. In other embodiments, the protected shared memory 112 is a memory that is separate from the memory 206. The protected shared memory 112 allows for communications between logic that executes during boot time of the diskless iSCSI client 102 and logic that executes subsequent to the boot. For example, the network boot BIOS logic 108 and the pre-iSCSI driver logic 110 can store data into the protected shared memory 112 that can be read and utilized by driver logic executing after the diskless iSCSI client 102 has completed boot operations. Moreover, in one embodiment, the protected shared memory 112 is protected from being read from and written to by the operating system executing on the diskless iSCSI client 102.

The ports 208A-208N represent both physical and/or logical ports that allow for communication between the diskless iSCSI client 102 and other devices coupled thereto through network 104 (e.g., the DHCP server 106). In one embodiment, the network boot BIOS logic 108 and the pre-iSCSI driver logic 110 may be processes or tasks that can reside within the memory 206 and/or the processor 202 and can be executed within the processor 202. However, embodiments of the invention are not so limited, as the network boot BIOS logic 108 and the pre-iSCSI driver logic 110 may be different types of hardware (such as digital logic) executing the operations described therein (which is described in more detail below).

Figure 3:
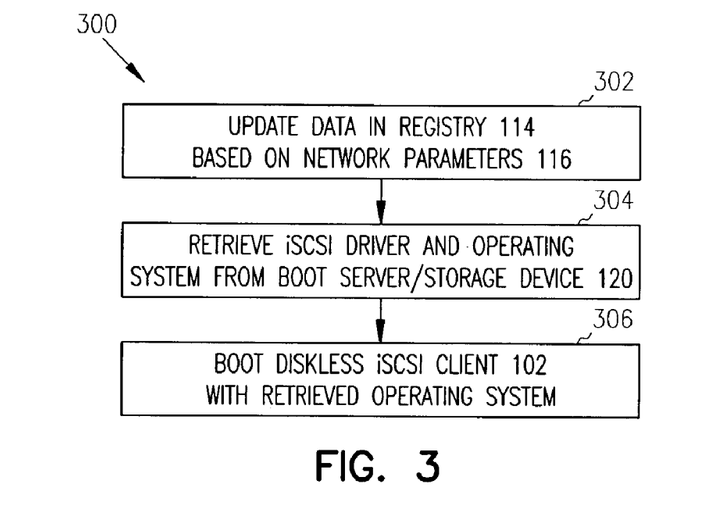
FIG. 3 illustrates a flow diagram for boot time modification of a registry for iSCSI network boot operations, according to one embodiment of the invention.

The operations of the system 100 will now be described. FIG. 3 illustrates a flow diagram for boot time modification of a registry for iSCSI network boot operations, according to one embodiment of the invention.

In block 302 of the flow diagram 300, data in the registry 114 is updated based on the network parameters 116. With reference to the system 100, the pre-iSCSI driver logic 110 updates data in the registry 114 based on the network parameters 116. In one embodiment, the pre-iSCSI driver logic 110 updates the data in the registry 114 based on the network parameters 116 stored in the protected shared memory 112. As will be described in more detail below, the network boot BIOS logic 108 retrieves the network parameters 116 from the DHCP server 106 and stores the network parameters 116 in the protected shared memory 112. While a number of different types of network parameters can be retrieved and stored in the protected shared memory 112, in one embodiment, the network parameters 116 stored therein include the IP address, the subnet mask and the gateway of the port on which the diskless iSCSI client 102 communicates based on the iSCSI protocol. However, embodiments of the invention are not so limited as other types of network parameters (such as the IP address of the DNS server utilized by the diskless iSCSI client 102) can be stored in the protected shared memory 112 for subsequent use in the updating of the registry 114. The operations of the block 302 are described in more detail below in conjunction with the flow diagram 400 of FIG. 4. Control continues at block 304.

In block 304, an iSCSI driver and an operating system are retrieved from a remote server. With reference to the system 100, the network boot BIOS logic 108 retrieves the iSCSI driver and the operating system from the boot server/storage device 120. A more detailed description of this retrieval of the iSCSI driver and the operating system is described in U.S. patent application entitled "iSCSI Computer Boot System and Method", Ser. No. 10/371,909, filed Feb. 21, 2003, to Mark A. Bakke, Edward A. Soltis, Pawlo P. Prawdiuk and Charles Stevens Rissmeyer. Control continues at block 306.

In block 306, the iSCSI client 102 is booted with the retrieved operating system. The operating system is loaded into the memory 206 for execution. In various embodiments of the invention, the operating system may be any operating system, including Microsoft Windows and UNIX, including UNIX versions such as Linux, AIX or sun UNIX. Moreover, the diskless iSCSI client 102 executes the iSCSI driver to retrieve data from remote storage devices using iSCSI communications. A more detailed description of this booting of the diskless iSCSI client 102 with the retrieved operating system is described in U.S. patent application entitled "iSCSI Computer Boot System and Method", Ser. No. 10/371,909, filed Feb. 21, 2003, to Mark A. Bakke, Edward A. Soltis, Pawlo P. Prawdiuk and Charles Stevens Rissmeyer.

Figure 4:
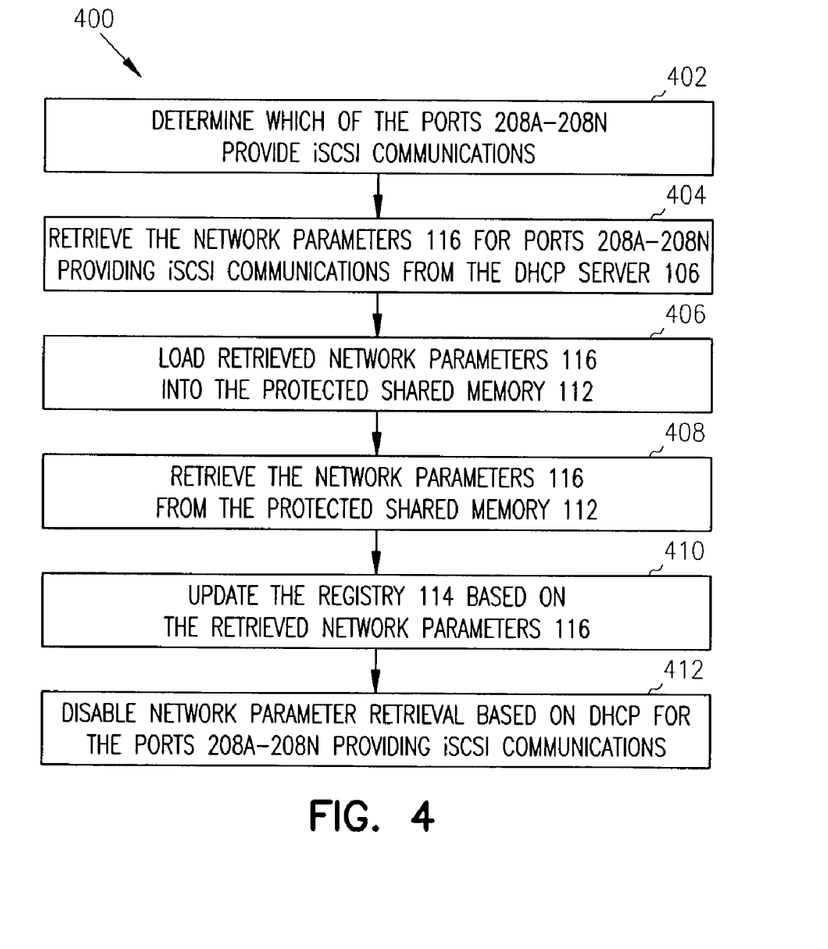
FIG. 4 illustrates a flow diagram for updating a registry for iSCSI network boot operations, according to one embodiment of the invention.

A more detailed description of the updating of the data in the registry 114 based on the network parameters 116 will now be described. In particular, FIG. 4 illustrates a flow diagram for updating a registry for iSCSI network boot operations, according to one embodiment of the invention.

In block 402 of the flow diagram 400, the ports 208A-208N that provides iSCSI communications are determined. With reference to the system 100, the network boot BIOS logic 108 determines which of the ports 208A-208N provides iSCSI communications for the diskless iSCSI client 102. As described above, at least one of the ports 208A-208N allows for iSCSI communications to retrieve the operating system and related boot drivers from a remote disk on a server (such as the boot server/storage device 120) to be executed on the diskless iSCSI client 102. The given port(s) 208A-208N also allow for iSCSI communications for retrieval of data from this same remote disk and/or a different remote disk on a same and/or different server once the operating system is executing on the diskless iSCSI client 102. In one embodiment, the designation of the port(s) 208A-208N that provide iSCSI communications is stored locally within the registry 114 of the diskless iSCSI client 102. According, the network boot BIOS logic 108 retrieves the value of the port(s) 208A-208N for iSCSI communications from the registry 114. Control continues at block 404.

In block 404, the network parameters 116 for the ports 208A-208N allowing for iSCSI communications are retrieved from the DHCP server 106. With reference to the system 100, the network boot BIOS logic 108 retrieves the network parameters 116 for the ports 208A-208N allowing for iSCSI communications from the DHCP server 106. As described above, while a number of different types of network parameters may be retrieved from the DHCP server 106, in one embodiment, the network boot BIOS logic 108 retrieves the assigned IP address, the associated subnet mask and the gateway for the port of the diskless iSCSI client 102 providing iSCSI communications. However, embodiments of the invention are not so limited. In another embodiment, other types of network parameters can be retrieved from the DHCP server 106. For example, the network boot BIOS logic 106 may retrieve the IP address of the DNS server utilized by the diskless iSCSI client 102 for translation between names and addresses of servers coupled to the network 104. Control continues at block 406.

In block 406, the retrieved network parameters 116 are loaded into the protected shared memory 112. With reference to the system 100, the network boot BIOS logic 108 stores the retrieved network parameters 116 into the protected shared memory 112. Control continues at block 408.

In block 408, the network parameters 116 are retrieved from the protected shared memory 112. With reference to the system 100, the pre-iSCSI driver logic 110 retrieves the network parameters 116 from the protected shared memory 112. Control continues at block 410.

In block 410, the registry 114 is updated based on the retrieved network parameters 116. With reference to the system 100, the pre-iSCSI driver logic 110 updates the data in the registry 114 based on the retrieved network parameters 116. As described above, a number of different variables related to the operations of the diskless iSCSI client 102 are assigned values and stored in the registry 114. Accordingly, the pre-iSCSI driver logic 110 updates the variables in the registry 114 related to the retrieved network parameters 116. For example, a variable is associated with the value of the IP address of the ports 208 providing iSCSI communication; a different variable is associated with the value of the subnet mask for this IP address; another variable is associated with the value of the gateway for this port, etc. Therefore, the pre-iSCSI driver logic 110 updates these values based on the retrieved network parameters 116. Control continues at block 412.

In block 412, network parameter retrieval based on DHCP is disabled for the ports 208A-208N that provide iSCSI communications for the diskless iSCSI client 102. With reference to the system 100, the pre-iSCSI driver logic 110 disables the network parameter retrieval based on DHCP for the ports 208A-208N that provide iSCSI communications for the diskless iSCSI client 102. The registry 114 includes a Boolean variable ("enable DHCP") for the different ports 208A-208N that indicate whether network parameters, such as dynamically assigned IP addresses, need to be retrieved from the DHCP server 106 for these different ports 208A-208N. Accordingly, in an embodiment, the pre-iSCSI driver logic 110 disables the network parameter retrieval based on DHCP for the ports 208A-208N that provide iSCSI communications by setting the "enable DHCP" Boolean variables for these ports 208A-208N to logical false values. Therefore, as described, logic/applications executing in the diskless iSCSI client 102 will not retrieve network parameters from the DHCP server 106 subsequent to the boot operations of the diskless iSCSI client 102. The operations of the flow diagram 400 are complete. Therefore, as described, embodiments of the invention retrieve network parameters from a remote device and update the registry for this client device prior to operating system execution, which includes the operation of the iSCSI driver for retrieval of data from a remote disk based on iSCSI operations.

Thus, a method, apparatus and system for different embodiments for boot time modification of the registry data for iSCSI network boot operations have been described. Although the present invention has been described with reference to specific exemplary embodiments, it will be evident that various modifications and changes may be made to these embodiments without departing from the broader spirit and scope of the invention. For example, while the operations have been described with reference to a diskless iSCSI client, in another embodiment, such operations may be incorporated into an apparatus that includes a disk and/or is not based on the iSCSI protocol. Moreover, while operations have been described wherein the network parameters are retrieved from a DHCP server, in other embodiments, these network parameters may be retrieved from other sources, such as other types of server, routers, a different client, etc. Therefore, the specification and drawings are to be regarded in an illustrative rather than a restrictive sense.

What is claimed is:

1. A method comprising:
retrieving a network address for a computing device from a remote server, wherein retrieving the network address includes retrieving an Internet Protocol address from a Dynamic Host Configuration Protocol Server;
updating data in a registry of the computing device based on the value of the network parameter, wherein the retrieving of the network parameter and the updating of the data in the registry are performed prior to executing an operating system within the computing device, wherein executing the operating system the network boot operations within the computing device includes retrieving the operating system for the computing device based on an Internet Protocol Small Computer System Interface protocol; and
disabling a Dynamic Host Configuration Protocol retrieval setting within the registry, wherein the disabling occurs prior to the operating system executing within the computing device.

2. The method of claim 1, wherein retrieving the network address for the computing device from the remote server includes retrieving a subnet mask and gateway for the computing device from the DHCP server.

3. A method comprising:
updating data for a port in a registry of a diskless Internet Protocol Small Computer System Interface (iSCSI) client based on retrieval of at least one network parameter from a Dynamic Host Configuration Protocol (DHCP) server, wherein the port is a port providing iSCSI communications for the iSCSI client, wherein updating data for the port in the registry includes disabling DHCP retrieval of network parameters, wherein the disabling occurs prior to the operating system executing within the computing device;

retrieving an iSCSI driver and the operating system for the diskless iSCSI client from a boot server; and booting the diskless iSCSI client with the retrieved operating system, wherein the updating, the retrieving and the booting are performed prior to the retrieved operating system executing within the iSCSI client.

4. The method of claim 3, wherein updating the data for the port in the registry of the diskless iSCSI client based on retrieval of the at least one network parameter from the DHCP server includes updating the data for the port in the registry of the diskless iSCSI client based on retrieval of an Internet Protocol address from the DHCP server.

5. The method of claim 4, wherein updating the data for the port in the registry of the diskless iSCSI client based on retrieval of the at least one network parameter from the DHCP server includes updating the data for the port in the registry of the diskless iSCSI client based on retrieval of a gateway and a subnet mask from the DHCP server.

6. An apparatus comprising:
a registry operable to store system parameters for the apparatus;
a memory that includes a protected area, wherein the protected area is operable to store at least one network parameter retrieved from a Dynamic Host Configuration Protocol (DHCP) server; and
a pre-Internet Protocol Small Computer System Interface logic operable to update data within the system parameters in the registry based on the at least one network parameter prior to execution of an operating system within the apparatus, wherein the network parameter includes a setting to disable DHCP retrieval of network parameters from the DHCP server for the apparatus wherein the disable occurs prior to the operating system executing within the computing device.

7. The apparatus of claim 6, wherein the network parameter is a parameter from a group consisting of an Internet Protocol address, a subnet mask and a gateway.

8. A system comprising:
a registry operable to store parameters for the system;
a random access memory that includes a protected shared memory;
a port operable to communicate Internet Protocol Small Computer System Interface (iSCSI) communications; and
a processor operable to execute a network boot logic and a pre-iSCSI logic, the network boot logic to retrieve at least one network parameter from a Dynamic Host Configuration Protocol (DHCP) server and to store the at least one network parameter in the protected shared memory, wherein the pre-iSCSI logic is to update a value of at least one parameter related to network communications for the port among the parameters for the system in the registry prior to when a retrieved operating system within the system is to execute network boot operations wherein the at least one parameter related to the network communications for the port includes a setting to disable DHCP retrieval of network parameters from the DHCP server prior to the executing the operating system within the computing device.

9. The system of claim 8, wherein the at least one parameter related to the network communications for the port is a parameter from a group consisting of an Internet Protocol address, a subnet mask, a gateway and an address of a Domain Name Server that is coupled to the system.

10. A computer storage medium that provides instructions, which
when executed by a machine, cause said machine to perform operations comprising:
retrieving a network address for a computing device from a remote server wherein retrieving the network address includes retrieving an Internet Protocol address from a Dynamic Host Configuration Protocol Server;
updating data in a registry of the computing device based on the value of the network parameter, wherein the retrieving of the network parameter and the updating of the data in the registry are performed prior to executing an operating system within the computing device, wherein executing the operating system the network boot operations within the computing device includes retrieving the operating system for the computing device based on an Internet Protocol Small Computer System Interface protocol; and
disabling a Dynamic Host Configuration Protocol retrieval setting within the registry, wherein the disabling occurs prior to the operating system executing within the computing device.

11. The computer storage medium of claim 10, wherein retrieving the network address for the computing device from the remote server includes retrieving a subnet mask and gateway for the computing device from the DHCP server.

12. A computer storage medium that provides instructions, which
when executed by a machine, cause said machine to perform operations comprising:
updating data for a port in a registry of a diskless Internet Protocol Small Computer System Interface (iSCSI) client based on retrieval of at least one network parameter from a Dynamic Host Configuration Protocol (DHCP) server, wherein the port is a port providing iSCSI communications for the iSCSI client, wherein updating data for the port in the registry includes disabling DHCP retrieval of network parameters wherein the disabling occurs prior to an operating system executing within the computing device;
retrieving an iSCSI driver and the operating system for the diskless iSCSI client from a boot server; and
booting the diskless iSCSI client with the retrieved operating system, wherein the updating, the retrieving and the booting are performed prior to the operating system executing within the iSCSI client.

13. The computer storage medium of claim 12, wherein updating the data for the port in the registry of the diskless iSCSI client based on retrieval of the at least one network parameter from the DHCP server includes updating the data for the port in the registry of the diskless ISCSI client based on retrieval of an Internet Protocol address from the DHCP server.

14. The computer storage medium of claim 13, wherein updating the data for the port in the registry of the diskless ISCSI client based on retrieval of the at least one network parameter from the DHCP server includes updating the data for the port in the registry of the diskless ISCSI client based on retrieval of a gateway and a subnet mask from the DHCP server.

15. An apparatus comprising:
means for retrieving a network address for a computing device from a remote server wherein retrieving the network address includes retrieving an Internet Protocol address from a Dynamic Host Configuration Protocol Server;

means for updating data in a registry of the computing device based on the value of the network parameter, wherein the retrieving of the network parameter and the updating of the data in the registry are performed prior to executing an operating system within the computing device, wherein executing the operating system the network boot operations within the computing device includes retrieving the operating system for the computing device based on an Internet Protocol Small Computer System Interface protocol; and means for disabling a Dynamic Host Configuration Protocol retrieval setting within the registry, wherein the disabling occurs prior to the operating system executing within the computing device.

16. The apparatus of claim 15, wherein the means for retrieving the network address for the computing device from the remote server includes means for retrieving a subnet mask and gateway for the computing device from the DHCP server.

17. A system comprising:

means for updating data for a port in a registry of a diskless Internet Protocol Small Computer System Interface (iSCSI) client based on retrieval of at least one network parameter from a Dynamic Host Configuration Protocol (DHCP) server, wherein the port is a port providing iSCSI communications for the iSCSI client wherein updating data for the port in the registry includes disabling DHCP retrieval of network parameters, wherein the disabling occurs prior to an operating system executing within the computing device;

means for retrieving an iSCSI driver and an operating system for the diskless iSCSI client from a boot server; and means for booting the diskless iSCSI client with the retrieved operating system, wherein the means for updating, the means for retrieving and the means for booting are performed prior to the operating system executing within the iSCSI client.

18. The system of claim 17, wherein the means for updating the data for the port in the registry of the diskless iSCSI client based on retrieval of the at least one network parameter from the DHCP server includes means for updating the data for the port in the registry of the diskless iSCSI client based on retrieval of an Internet Protocol address from the DHCP server.

19. The system of claim 18, wherein means for updating the data for the port in the registry of the diskless iSCSI client based on retrieval of the at least one network parameter from the DHCP server includes means for updating the data for the port in the registry of the diskless iSCSI client based on retrieval of a gateway and a subnet mask from the DHCP server.

* * * * *

UNITED STATES PATENT AND TRADEMARK OFFICE
CERTIFICATE OF CORRECTION

| | | |
|---|---|---|
| PATENT NO. | : 7,363,356 B1 | Page 1 of 1 |
| APPLICATION NO. | : 10/395927 | |
| DATED | : April 22, 2008 | |
| INVENTOR(S) | : Rissmeyer et al. | |

It is certified that error appears in the above-identified patent and that said Letters Patent is hereby corrected as shown below:

On the Title page, in field (54), in "Title", in column 1, line 2, delete "ISCSI" and insert -- iSCSI --, therefor.

In column 1, line 2, delete "ISCSI" and insert -- iSCSI --, therefor.

In column 3, lines 54-61, delete "In an exemplary embodiment, a machine-readable medium such as computer storage medium which includes volatile and/or non-volatile media (e.g. read only memory (ROM); random access memory (RAM); magnetic disk storage media; optical storage media; flash memory devices; etc) as well as transmission medium which includes optical, acoustical or other form of propagated signals (e.g. carrier waves, infrared signals, digital signals, etc)." and insert the same on Col. 3, Line 53, after "more processors, etc.)." as a continuation of the same Paragraph.

In column 10, line 55, in Claim 13, delete "ISCSI" and insert -- iSCSI --, therefor.

In column 10, line 60, in Claim 14, delete "ISCSI" and insert -- iSCSI --, therefor.

In column 10, line 62, in Claim 14, delete "ISCSI" and insert -- iSCSI --, therefor.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO.         : 7,363,356 B1
APPLICATION NO. : 10/395927
DATED                 : April 22, 2008
INVENTOR(S)       : Rissmeyer et al.

It is certified that error appears in the above-identified patent and that said Letters Patent is hereby corrected as shown below:

On the Title page, in field (54), in "Title", in column 1; line 2, delete "ISCSI" and insert -- iSCSI --, therefor.

On Sheet 1 of 2, in Fig. 1 (Referral Numeral 102), line 2, delete "ASCSI" and insert -- iSCSI --, therefor.

Signed and Sealed this

Twenty-fifth Day of November, 2008

JON W. DUDAS
*Director of the United States Patent and Trademark Office*

United States Patent
Rissmeyer et al.

(10) Patent No.: US 7,363,356 B1
(45) Date of Patent: Apr. 22, 2008

(54) BOOT MODIFICATION OF REGISTRY DATA FOR ISCSI NETWORK BOOT OPERATIONS (75) Inventors: Charles Steven Rissmeyer, Coon Rapids, MN (US); Edward Alan Soltis, Elk River, MN (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 10/395,927

(22) Filed: Mar. 24, 2003

(51) Int. Cl.
G06F 15/177 (2006.01)

(52) U.S. Cl. .................... 709/220; 709/217
(58) Field of Classification Search ......... 709/217, 709/220; 713/1, 2, 100
See application file for complete search history.

(56) References Cited

U.S. PATENT DOCUMENTS

| 5,974,547 | A | * | 10/1999 | Klimenko | 713/2 |
| 5,996,024 | A | | 11/1999 | Blumenau | |
| 6,105,130 | A | | 8/2000 | Wu et al. | |
| 6,434,695 | B1 | * | 8/2002 | Esfahani et al. | 713/2 |
| 6,609,151 | B1 | * | 8/2003 | Khanna et al. | 709/222 |
| 6,857,069 | B1 | * | 2/2005 | Rissmeyer et al. | 713/2 |
| 7,127,602 | B1 | * | 10/2006 | Bakke et al. | 713/2 |
| 2003/0097553 | A1 | | 5/2003 | Frye, Jr. | |
| 2003/0126242 | A1 | * | 7/2003 | Chang | 709/222 |
| 2004/0064647 | A1 | * | 4/2004 | DeWitt et al. | 711/135 |
| 2004/0138868 | A1 | | 7/2004 | Kuznetsov et al. | |
| 2004/0153694 | A1 | | 8/2004 | Nicholson et al. | |

* cited by examiner

Primary Examiner—John Follansbee
Assistant Examiner—Dhairya A. Patel
(74) Attorney, Agent, or Firm—Schwegman, Lundberg & Woessner, P.A.

(57) ABSTRACT

In one embodiment, a method includes retrieving a network parameter for a computing device from a remote server. The method also includes updating data in a registry of the computing device based on the value of the network parameter. The retrieving of the network parameter and the updating of the data in the registry are performed prior to executing an operating system within the computing device.

19 Claims, 2 Drawing Sheets

FIG. 1

FIG. 2

UNITED STATES PATENT AND TRADEMARK OFFICE
CERTIFICATE OF CORRECTION

PATENT NO.       : 7,363,356 B1
APPLICATION NO.  : 10/395927
DATED            : April 22, 2008
INVENTOR(S)      : Rissmeyer et al.

It is certified that error appears in the above-identified patent and that said Letters Patent is hereby corrected as shown below:

On the Title page, in field (54), in "Title", in column 1; line 2, delete "ISCSI" and insert -- iSCSI --, therefor.

On Sheet 1 of 2, in Fig. 1 (Referral Numeral 102), line 2, delete "ASCSI" and insert -- iSCSI --, therefor.

This certificate supersedes the Certificate of Correction issued November 25, 2008.

Signed and Sealed this

Twenty-third Day of December, 2008

JON W. DUDAS
*Director of the United States Patent and Trademark Office*

(12) United States Patent
Rissmeyer et al.

(10) Patent No.: US 7,363,356 B1
(45) Date of Patent: Apr. 22, 2008

(54) BOOT MODIFICATION OF REGISTRY DATA FOR iSCSI NETWORK BOOT OPERATIONS

(75) Inventors: Charles Steven Rissmeyer, Coon Rapids, MN (US); Edward Alan Soltis, Elk River, MN (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 10/395,927

(22) Filed: Mar. 24, 2003

(51) Int. Cl.
G06F 15/177 (2006.01)

(52) U.S. Cl. ............................... 709/220; 709/217

(58) Field of Classification Search ........... 709/217, 709/220; 713/1, 2, 100
See application file for complete search history.

(56) References Cited

U.S. PATENT DOCUMENTS

| | | | |
|---|---|---|---|
| 5,974,547 A * | 10/1999 | Klimenko | 713/2 |
| 5,996,024 A | 11/1999 | Blumenau | |
| 6,105,130 A | 8/2000 | Wu et al. | |
| 6,434,695 B1 * | 8/2002 | Esfahani et al. | 713/2 |
| 6,609,151 B1 * | 8/2003 | Khanna et al. | 709/222 |
| 6,857,069 B1 * | 2/2005 | Rissmeyer et al. | 713/2 |
| 7,127,602 B1 * | 10/2006 | Bakke et al. | 713/2 |
| 2003/0097553 A1 | 5/2003 | Frye, Jr. | |
| 2003/0126242 A1 * | 7/2003 | Chang | 709/222 |
| 2004/0064647 A1 * | 4/2004 | DeWhitt et al. | 711/135 |
| 2004/0138868 A1 | 7/2004 | Kuznetsov et al. | |
| 2004/0153694 A1 | 8/2004 | Nicholson et al. | |

* cited by examiner

Primary Examiner—John Follansbee
Assistant Examiner—Dhairya A. Patel
(74) Attorney, Agent, or Firm—Schwegman, Lundberg & Woessner, P.A.

(57) ABSTRACT

In one embodiment, a method includes retrieving a network parameter for a computing device from a remote server. The method also includes updating data in a registry of the computing device based on the value of the network parameter. The retrieving of the network parameter and the updating of the data in the registry are performed prior to executing an operating system within the computing device.

19 Claims, 2 Drawing Sheets

FIG. 1

FIG. 2